(12) United States Patent
Yi et al.

(10) Patent No.: US 9,980,258 B2
(45) Date of Patent: May 22, 2018

(54) METHOD AND APPARATUS FOR WIRELESS COMMUNICATION

(71) Applicant: LG ELECTRONICS INC., Seoul (KR)

(72) Inventors: Yunjung Yi, Seoul (KR); Joonkui Ahn, Seoul (KR); Dongyoun Seo, Seoul (KR); Bonghoe Kim, Seoul (KR); Suckchel Yang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 14/910,521

(22) PCT Filed: Aug. 6, 2014

(86) PCT No.: PCT/KR2014/007295
§ 371 (c)(1),
(2) Date: Feb. 5, 2016

(87) PCT Pub. No.: WO2015/020440
PCT Pub. Date: Feb. 12, 2015

(65) Prior Publication Data
US 2016/0192350 A1    Jun. 30, 2016

Related U.S. Application Data

(60) Provisional application No. 61/862,949, filed on Aug. 6, 2013, provisional application No. 61/867,607, filed on Aug. 20, 2013, provisional application No. 61/868,098, filed on Aug. 21, 2013, provisional
(Continued)

(51) Int. Cl.
*H04W 72/04* (2009.01)
*H04W 52/14* (2009.01)
(Continued)

(52) U.S. Cl.
CPC ....... *H04W 72/0413* (2013.01); *H04L 5/0035* (2013.01); *H04L 5/0094* (2013.01);
(Continued)

(58) Field of Classification Search
CPC ........... H04W 72/0413; H04W 52/146; H04W 52/365; H04L 5/0035; H04L 5/0094
See application file for complete search history.

(56) References Cited

U.S. PATENT DOCUMENTS

2011/0080838 A1    4/2011    Larsson et al.
2012/0039226 A1    2/2012    Yang et al.
(Continued)

FOREIGN PATENT DOCUMENTS

CN    102378274 A    3/2012
CN    102577543 A    7/2012
CN    102835069 A    12/2012

*Primary Examiner* — Ian N Moore
*Assistant Examiner* — Ronald H Davis
(74) *Attorney, Agent, or Firm* — Birch, Stewart, Kolasch & Birch, LLP

(57) ABSTRACT

The invention is related to a wireless communication by user equipment (UE) based on capability of the UE. According to this application, signals are received on a downlink channel including a downlink control channel and a downlink data channel, a parameter is configured for the wireless communication based on the capability of the UE and information in the downlink control channel, and signals are transmitted on a uplink channel based on the configured parameter, wherein the signals are transmitted to at least two cells.

15 Claims, 6 Drawing Sheets

Related U.S. Application Data application No. 61/936,851, filed on Feb. 6, 2014, provisional application No. 62/007,939, filed on Jun. 5, 2014, provisional application No. 62/011,560, filed on Jun. 12, 2014.

(51) Int. Cl.
*H04W 52/36* (2009.01)
*H04L 5/00* (2006.01)
*H04W 52/32* (2009.01)

(52) U.S. Cl.
CPC ....... *H04W 52/146* (2013.01); *H04W 52/365* (2013.01); *H04L 5/001* (2013.01); *H04L 5/0044* (2013.01); *H04W 52/325* (2013.01)

(56) References Cited

U.S. PATENT DOCUMENTS

| | | |
|---|---|---|
| 2012/0044889 A1 | 2/2012 | Jen |
| 2012/0069826 A1 | 3/2012 | Nakao et al. |
| 2012/0184281 A1* | 7/2012 | Kim .................. H04W 72/0453 455/450 |
| 2013/0121271 A1 | 5/2013 | Chen et al. |
| 2014/0161060 A1* | 6/2014 | Nam ..................... H04L 5/0055 370/329 |
| 2015/0098441 A1* | 4/2015 | Peng .................. H04W 72/042 370/330 |
| 2015/0365831 A1* | 12/2015 | Ko ........................ H04L 5/0053 370/329 |

* cited by examiner

[Fig. 1]
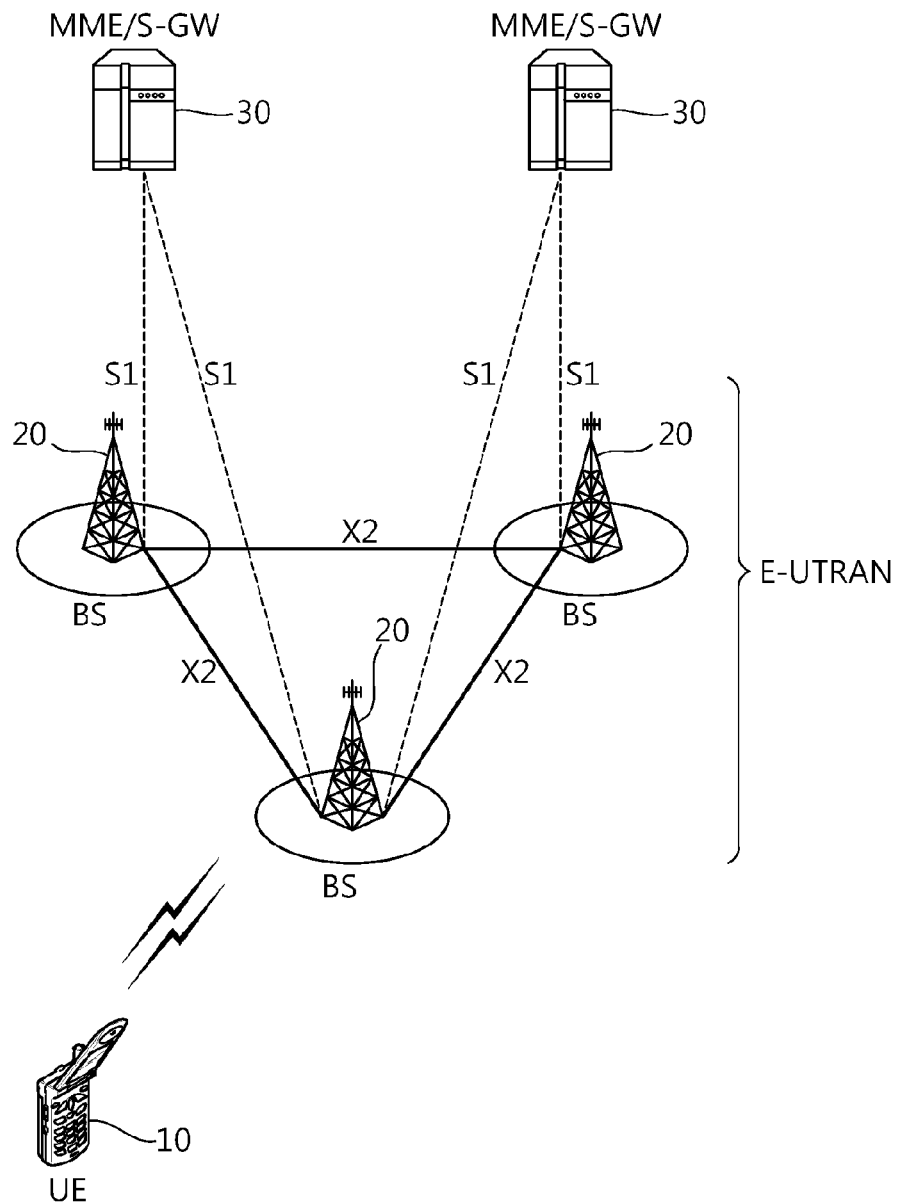

[Fig. 2]
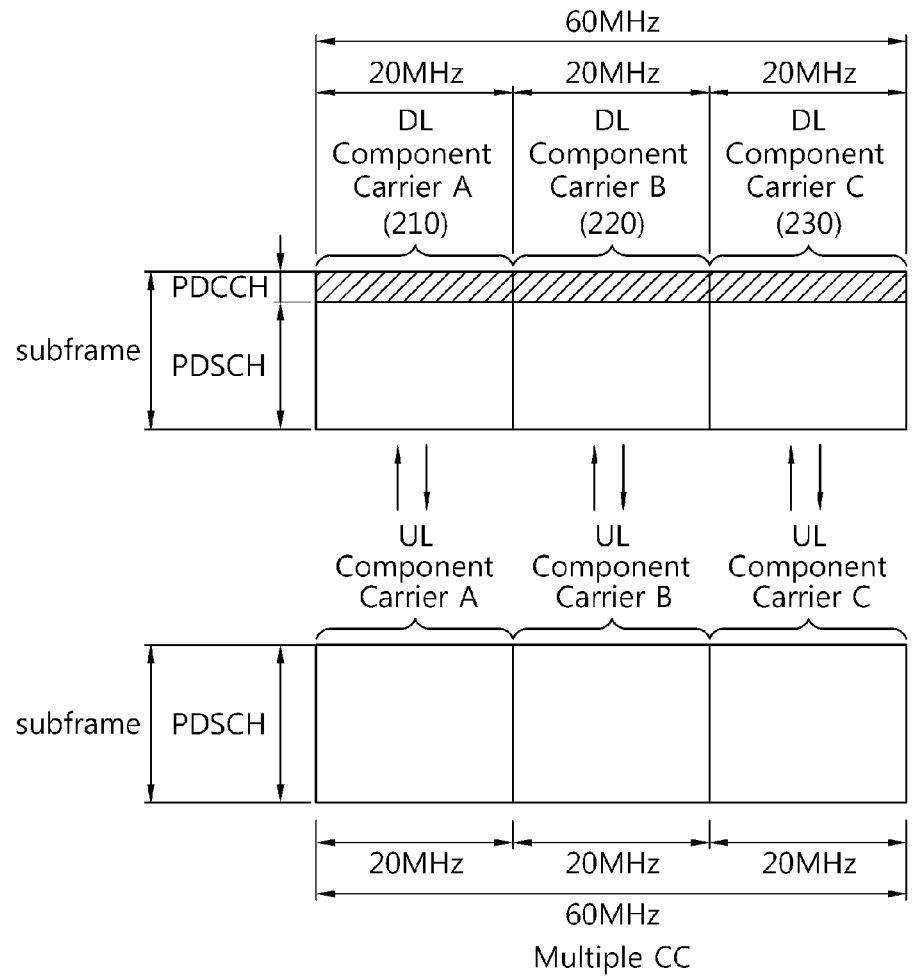
[Fig. 3]
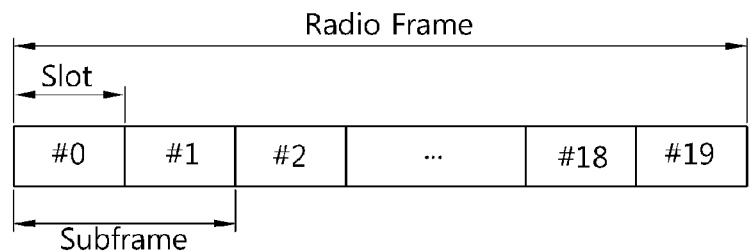

[Fig. 4]
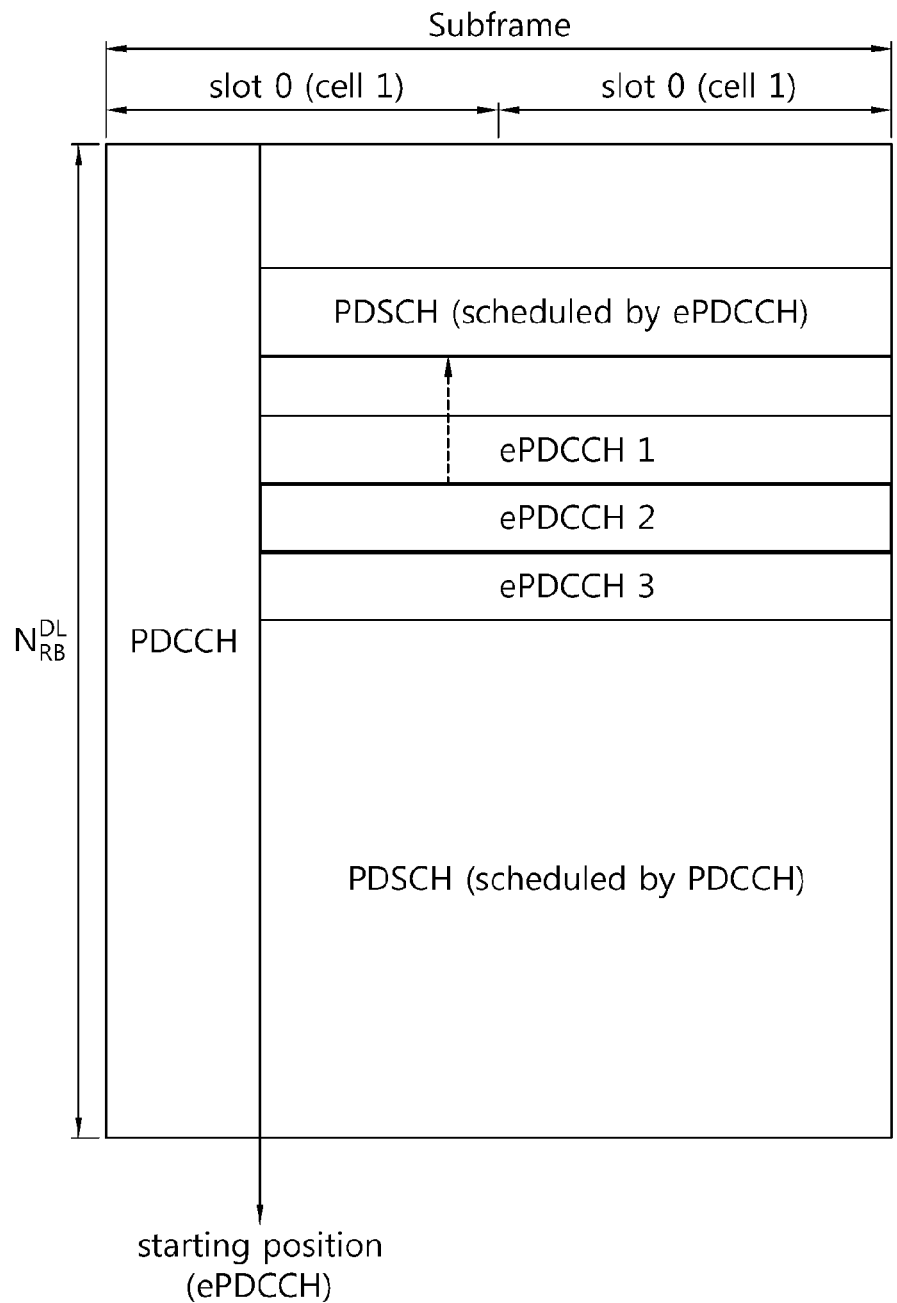

[Fig. 5]
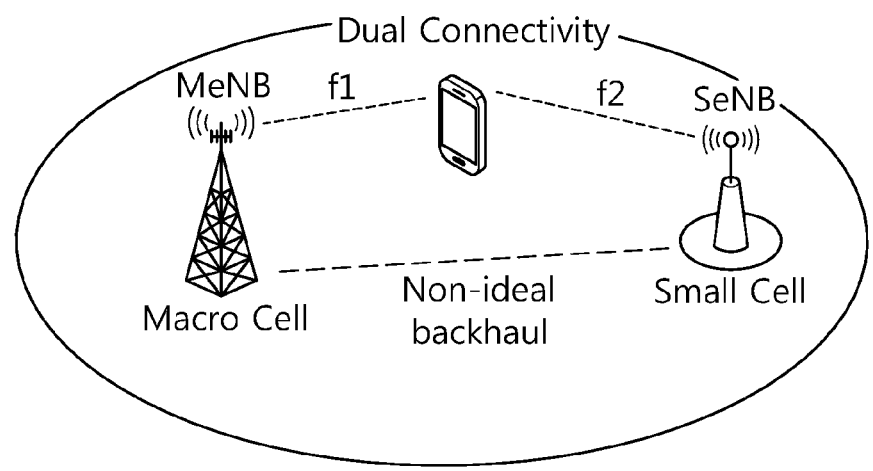

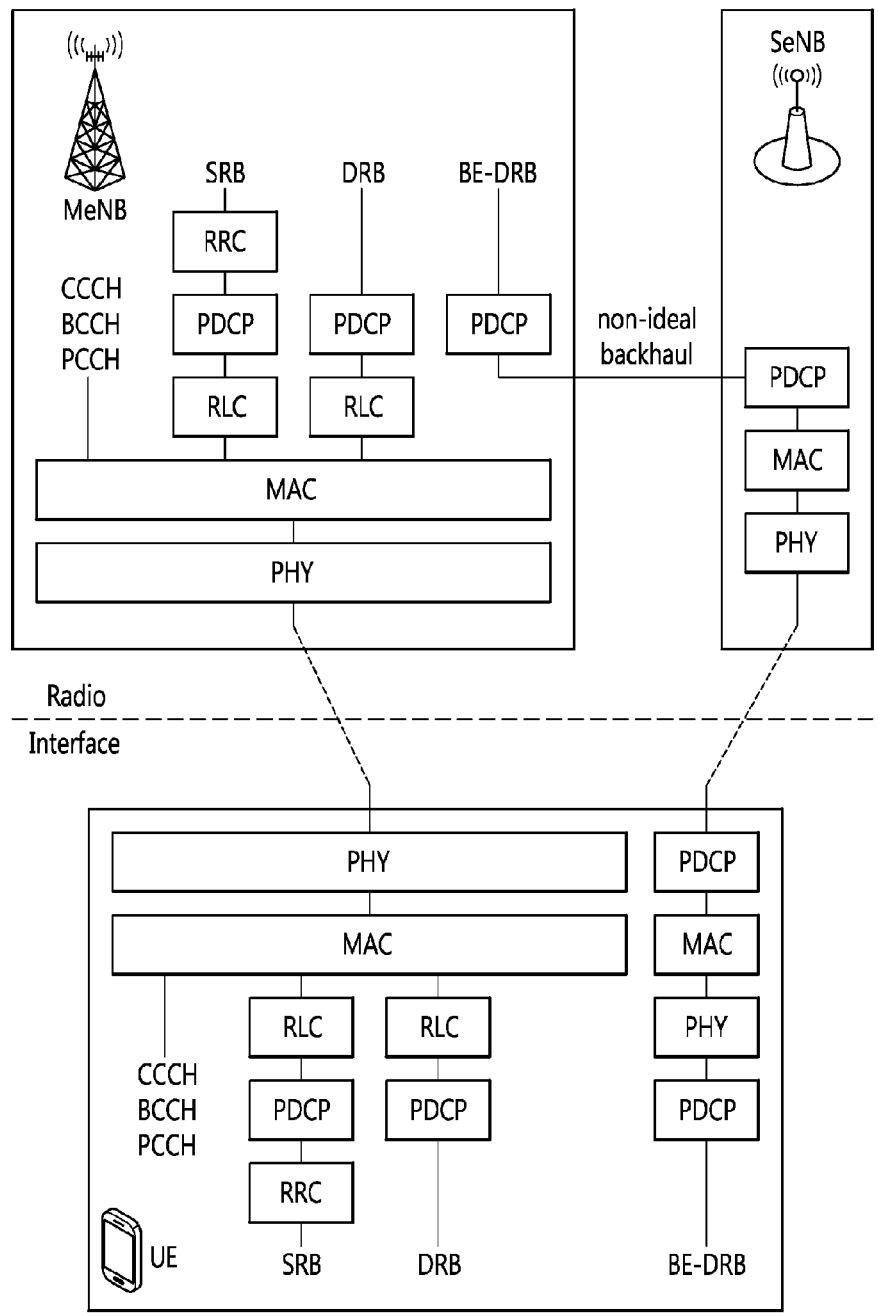
[Fig. 6]

[Fig. 7]
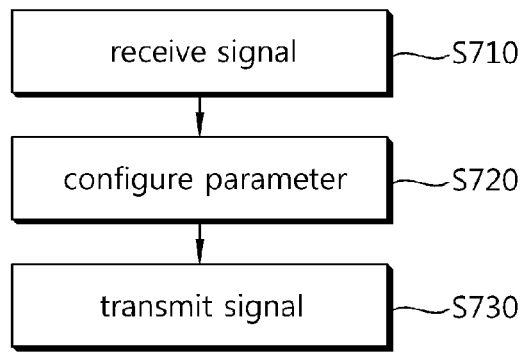
[Fig. 8]
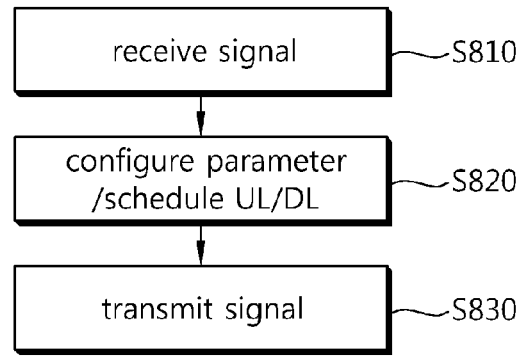
[Fig. 9]
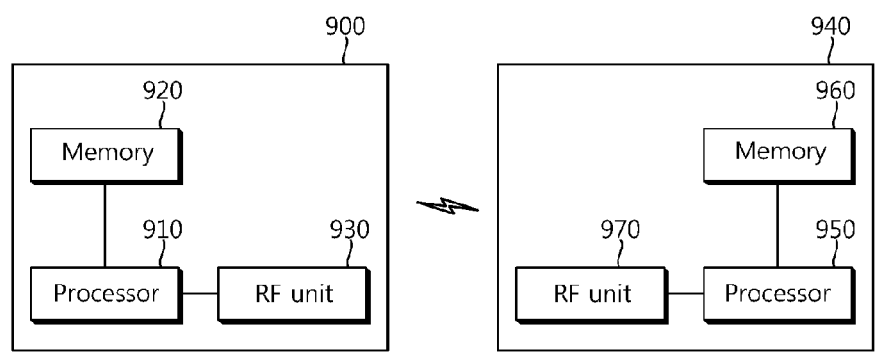

METHOD AND APPARATUS FOR WIRELESS COMMUNICATION

CROSS REFERENCE TO RELATED APPLICATIONS

This application is the National Phase of PCT International Application No. PCT/KR2014/007295, filed on Aug. 6, 2014, which claims priority under 35 U.S.C. 119(e) to U.S. Provisional Application No. 61/862,949, filed on Aug. 6, 2013, U.S. Provisional Application No. 61/867,607, filed on Aug. 20, 2013, U.S. Provisional Application No. 61/868,098, filed on Aug. 21, 2013, U.S. Provisional Application No. 61/936,851, filed on Feb. 6, 2014, U.S. Provisional Application No. 62/007,939, filed on Jun. 5, 2014, and U.S. Provisional Application No. 62/011,560, filed on Jun. 12, 2014, which are all hereby expressly incorporated by reference into the present application.

TECHNICAL FIELD

This invention related to user equipment (UE) capability in wireless communication. In particular, this invention concerns inter-site carrier aggregation when a UE is able to simultaneously transmit physical uplink shared channel and physical uplink control channel.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

For the efficient communication, it may be considered for UE to transmit plurality of channels concurrently. In this case, capability of UE needs to be considered. Here, other capability of the UE besides capability for concurrent transmission of channel such as capability of channel state information reporting and/or multi-input multi-output because the UE may be operated under situation of dual connectivity.

SUMMARY OF INVENTION

Technical Problem

An object of the present invention is to provide method and apparatus for wireless communication based on capabilities of the UE.

Another object of the present invention is to provide method and apparatus for simultaneous PUCCH/PUSCH transmission with non-contiguous resource allocation (RA) capability.

Another object of the present invention is to provide method and apparatus for reconfigure and operate under dual connectivity based on UE's capability.

Solution to Problem

One example of the present application is a method for wireless communication by user equipment (UE) based on capability of the UE, the method comprising receiving signals on a downlink channel including a downlink control channel and a downlink data channel, configuring a parameter for the wireless communication based on the capability of the UE and information in the downlink control channel and transmitting signals on a uplink channel based on the configured parameter, wherein the signals are transmitted to at least two cells.

Yet another example of the present application is an user equipment (UE) for wireless communication, the UE comprising a radio frequency (RF) unit for transmitting and receiving a radio signal, and a processor operatively coupled to the RF unit, wherein the processor configures a parameter for the wireless communication based on the capability of the UE and information in the downlink control channel, wherein the processor transmits signals via the RF unit on a uplink channel based on the configured parameter, and wherein the signals are transmitted to at least two cells.

Advantageous Effects of Invention

According to the present invention, wireless communication can be effectively performed based on capability of the UE.

According to the present invention, it is possible to transmit PUCCH/PUSCH simultaneously with non-contiguous RA efficiently.

According to the present invention, reconfiguration and operation based on the reconfiguration can be efficiently done based on UE's capability.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows an example of dual connectivity to a macro cell and a small cell.

FIG. 6 shows an example of a protocol architecture supporting dual connectivity.

FIG. 7 is a flow chart briefly describing UE's operation according to the present invention.

FIG. 8 is a flow chart briefly describing operation of eNB according to the present invention.

FIG. 9 is a block diagram which briefly describes a wireless communication system.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L≤DL≤CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)—precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MB-SFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, a UE may receive signals from more than one cell and transmit signals to more than one cell under some circumstances.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable.

Dual connectivity is an operation where a given UE consumes radio resources provided by at least two different network points (master eNB (MeNB) and secondary eNB (SeNB)) connected with non-ideal or ideal backhaul while UE is in RRC_CONNECTED mode.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

A UE may have multiple RX and TX capability to support carrier aggregation scenario if dual connectivity involves more than one frequency.

For efficient transmission for dual connectivity where tight and real-time coordination among MeNB and SeNB is not easily feasible and each eNB performs scheduling independently including uplink scheduling. UE may transmit uplink channel to MeNB and uplink channel to SeNB simultaneously. Uplink channel includes both uplink control channel and uplink shared channel. The uplink control channel may be an uplink control channel in physical layer (i.e. PUCCH) and the uplink shared channel may be an uplink shared channel in physical layer (i.e. PUSCH).

The UE may transmit PUCCH and PUSCH simultaneously in a same component carrier. Even though the UE does not support simultaneous transmission of PUCCH and PUSCH in a single component carrier, the UE may transmit PUCCH and PUSCH concurrently in different component carriers.

In handling such a simultaneous PUCCH and PUSCH transmission, it may be required both RF and baseband capability to support the simultaneous PUCCH and PUSCH transmission. In 3GPP TS 36.331, the parameter of simultaneousPUCCH-PUSCH is described as the following.

simultaneousPUCCH-PUSCH: Parameter indicates whether simultaneous PUCCH and PUSCH transmissions is configured, 3GPP TS 36.213 [23, 10.1 and 5.1.1] can be referred. In prior art without supporting dual connectivity, E-UTRAN configures this field, only when the nonContiguousUL-RA-WithinCC-Info is set to supported in the band on which PCell is configured.

As PUCCH can be transmitted from PCell, there is no need to check whether the UE supports nonContiguousUL-RA-WithinCC-Info in another band on which SCell is configured.

In dual connectivity, however, PUCCH can be transmitted to SCell (this SCell can be called as P-SCell). Thus, E-UTRAN may configure this field for MeNB only if nonContiguousUL-RA-WithinCC-Info in band on which PCell is configured, and may configure this field for SeNB only if nonContiguousUL-RA-WithinCC-Info in the band on which P-SCell is configured.

More generally, E-UTRAN configures this field for one carrier group only if nonContiguousUL-RA-WithinCC-Info in band on which carrier carrying PUCCH is configured assuming that only one carrier in a carrier group can carry PUCCH.

This parameter simultaneousPUCCH-PUSCH is part of PUCCH-ConfigDedicated-v 1020 which is configured when a UE is configured with PCell. In other words, PUCCH-ConfigDedicated-v1020 may not be configured for SCells. PUCCH-ConfigDedicated-v 1020 is represented as table 1.

TABLE 1

```
PUCCH-ConfigDedicated-v1020 ::=      SEQUENCE {
    pucch-Format-r10                 CHOICE {
        format3-r10                      SEQUENCE {
            n3PUCCH-AN-List-r10          SEQUENCE (SIZE (1..4)) OF INTEGER (0..549)    OPTIONAL,-- Need ON
            twoAntennaPortActivatedPUCCH-Format3-r10   CHOICE {
                release                                NULL,
                setup                                  SEQUENCE {
                    n3PUCCH-AN-ListP1-r10    SEQUENCE (SIZE (1..4)) OF INTEGER (0..549)
                }
            }                                                                          OPTIONAL -- Need ON
        },
        channelSelection-r10             SEQUENCE {
            n1PUCCH-AN-CS-r10            CHOICE {
                release                      NULL,
                setup                        SEQUENCE {
                    n1PUCCH-AN-CS-List-r10   SEQUENCE (SIZE (1..2)) OF N1PUCCH-AN-CS-r10
                }
            }                                                                          OPTIONAL -- Need ON
        }                                                                              OPTIONAL,-- Need OR
    twoAntennaPortActivatedPUCCH-Format1a1b-r10   ENUMERATED {true}    OPTIONAL,-- Need OR
    simultaneousPUCCH-PUSCH-r10                   ENUMERATED {true}    OPTIONAL,-- Need OR
    n1PUCCH-AN-RepP1-r10                          INTEGER (0..2047)    OPTIONAL -- Need OR
}
```

In terms of UE capability to support simultaneous PUCCH and PUSCH transmission, a UE may report the capability which is a part of phyLayerParameters-v1020 as shown in table 2.

TABLE 2

```
UE-EUTRA-Capability-v1020-IEs ::=    SEQUENCE {
    ue-Category-v1020                    INTEGER (6..8)              OPTIONAL,
    phyLayerParameters-v1020             PhyLayerParameters-v1020    OPTIONAL,
```

TABLE 2-continued

| rf-Parameters-v1020 | RF-Parameters-v1020 | OPTIONAL, |
| measParameters-v1020 | MeasParameters-v1020 | OPTIONAL, |
| featureGroupIndRel10-r10 | BIT STRING (SIZE (32)) | OPTIONAL, |
| interRAT-ParametersCDMA2000-v1020 | IRAT-ParametersCDMA2000-1XRTT-v1020 | OPTIONAL, |
| ue-BasedNetwPerfMeasParameters-r10 | UE-BasedNetwPerfMeasParameters-r10 | OPTIONAL, |
| interRAT-ParametersUTRA-TDD-v1020 | IRAT-ParametersUTRA-TDD-v1020 | OPTIONAL, |
| nonCriticalExtension | UE-EUTRA-Capability-v1060-IEs | OPTIONAL |
| } | | |

This simultaneous PUCCH-PUSCH capability is defined as band-agnostic. In other words, this capability denotes the UE processing capability to produce PUCCH and PUSCH simultaneously.

Since, in dual connectivity, PUCCH to MeNB and PUCCH to SeNB can occur simultaneously, separate UE processing capability on simultaneous PUCCH-PUCCH can be also considered. In this case, PUCCH-PUSCH simultaneous transmission per each eNB can be configured only if the UE supports PUCCH-PUSCH simultaneous transmission as well as PUCCH-PUCCH simultaneous transmission.

If UE does not support PUCCH-PUCCH simultaneous transmission, it may be assumed that the UE cannot support dual connectivity if this capability is introduced.

Alternatively, if a UE indicates that it can support dual connectivity in a band-combination, the network can assume that the UE supports PUCCH-PUCCH simultaneous transmission.

The field, simultaneousPUCCH-PUSCH-r10, defines whether the UE baseband supports simultaneous transmission of PUCCH and PUSCH, and may be band agnostic. If the UE indicates support of baseband capability for simultaneous transmission of PUCCH and PUSCH using this field, simultaneousPUCCH-PUSCH-r10, and if the UE indicates support of RF capability for non-contiguous UL resource allocation within a component carrier for a particular E-UTRA radio frequency band, then the UE supports simultaneous transmission of PUCCH and PUSCH within each component carrier of the band.

If the UE indicates support of baseband capability for simultaneous transmission of PUCCH and PUSCH using this field, simultaneousPUCCH-PUSCH-r10, and if the UE indicates support of carrier aggregation in UL, then the UE supports simultaneous transmission of PUCCH and PUSCH across any UL component carriers which the UE can aggregate.

However, radio frequency (RF) capability for non-contiguous UL resource allocation may be defined per band.

The field, nonContiguousUL-RA-WithinCC-Info-r10, defines whether the UE RF supports non-contiguous UL resource allocations within a component carrier, and is signaled per E-UTRA radio frequency band which the UE supports.

Now, assuming a case of carrier aggregation with CC1 (F1) and CC2 (F2) where a UE is capable of supporting nonContiguousUL in f1, but not in f2, this invention discusses a few cases and provides mechanisms to handle the cases.

Case 1: F1 is PCell and F2 is SCell over ideal backhaul (i.e., intra-site CA or CA scenario 4—RRH).

More generally, we can call it as MCG (a carrier group containing PCell) and SCG (a carrier group containing P-SCell) where PCell in F1 and P-SCell in F2. The proposed ideas in this application can be applied to carrier groups of MCG and SCG where carrier groups are either configured by one eNB or by separate eNBs (such as MeNB has MCG and SeNB has SCG). More specifically, a carrier group configured by one eNB to allow PUCCH offloading to more than one carrier can be an example.

Case 2: F2 is PCell and F1 is SCell over ideal backhaul (i.e., intra-site CA or CA scenario 4—RRH)

Case 3: F1 is PCell and F2 is SCell over non-ideal backhaul (i.e., inter-site CA)

Case 4: F2 is PCell and F1 is SCell over non-ideal backhaul (i.e., inter-site CA)

Here, carrier aggregation scenarios are (1) scenario 1 allocating a contiguous band and providing identical coverage using multiple component carriers, (2) scenario 2 configured with different coverage between component carriers using different frequencies, (3) scenario 2 in which sectors of certain component carriers are oriented to boundary of another component carrier's sector, (4) scenario 4 using remote radio head (RRH) unit using different frequency from frequency of macro cell.

Table 3 defines relations between two fields (nonContiguousUL-RA-WithinCC-Info-r10 and simultaneousPUCCH-PUSCH configured) and each cases mentioned above.

TABLE 3

| | | (nonContiguousUL-RA-WithinCC-Info-r10, simultaneousPUCCH-PUSCH-r10) | | | |
|---|---|---|---|---|---|
| | | (Yes, Yes) | (Yes, No) | (No, No) | (No, Yes) - embodiment 5 |
| Case 1 | | Support simultaneous PUCCH/PUSCH | No simultaneous PUCCH/PUSCH simultaneous TX | No simultaneous PUCCH/PUSCH simultaneous TX | PUCCH and PUSCH over different CCs only |
| Case 2 | | Misconfiguration as SCell RF does not support simultaneous PUCCH/PUSCH, UE shall assume mis-configuration and ignore the configuration - embodiment 1. | In case, F2 does not support simultaneous PUCCH/PUSCH, it is always assume that simultaneous PUCCH/PUSCH is disabled (follow PCell RF capability) | No simultaneous PUCCH/PUSCH, simultaneous TX | |

TABLE 3-continued

| | (nonContiguousUL-RA-WithinCC-Info-r10, simultaneousPUCCH-PUSCH-r10) | | | |
|---|---|---|---|---|
| | (Yes, Yes) | (Yes, No) | (No, No) | (No, Yes) - embodiment 5 |
| Case 3 | If PUCCH is also transmitted via SCell, this option would be an issue as SCell does not support PUCCH/PUSCH simultaneous TX - embodiment 2 | Even though PCell may support simultaneous PUCCH/PUSCH, if inter-site CA is used between bands where at least one band does not support simultaneous PUCCH/PUSCH TX, always simultaneous PUCCH/PUSCH TX should be disabled - embodiment 2 | No simultaneous PUCCH/PUSCH simultaneous TX, to support inter-site CA, this case may need some special treatment - embodiment 3 | |
| Case 4 | To support at least concurrent PUSCH (PCell) and PUCCH (SCell) transmissions, this option may be interpreted as only for simultaneous PUCCH/PUSCH over different CCs— embodiment 4 | Even though SCell may support simultaneous PUCCH/PUSCH, if inter-site CA is used between bands where at least one band does not support simultaneous PUCCH/PUSCH TX, always simultaneous PUCCH/PUSCH TX should be disabled - embodiment 2 | No simultaneous PUCCH/PUSCH simultaneous TX, to support inter-site CA, this case may need some special treatment - embodiment 3 | |

The cases in the table 3 were defined before. Referring to the table 1, the combination of case 1 and (Yes, Yes), case 1 and (Yes, No), case 1 and (No, No), case 2 and (No, No) may follow LTE release 11.

Also, referring to the table 1, there are some embodiments according to the relation between two fields (nonContiguousUL-RA-WithinCC-Info-r10 and simultaneousPUCCH-PUSCH configured) and each cases. These embodiments may be called embodiments for PUCCH/PUSCH simultaneous transmission and non-contiguous RA.

Here, detailed descriptions for the five embodiments in table 3 will be provided.

Embodiment 1 for PUCCH/PUSCH Simultaneous Transmission and Non-contiguous RA: Ideal Backhaul CA with One CC (PCell) without Simultaneous PUCCH/PUSCH RF Capability This Embodiment is for a combination of case 1 in the table 3 and (nonContiguousUL-RA-WithinCC-Info-r10=True, simultaneousPUCCH-PUSCH=True)

Assuming PUCCH is always transmitted to PCell, this embodiment 1 can be handled by assuming as a misconfiguration if a UE is configured with simultaneous PUCCH/PUSCH transmission and if PCell RF does not support simultaneous PUCCH/PUSCH TX.

If PUCCH CC can be configured or changed dynamically and if at least one band for a CA scenario does not support, simultaneous PUCCH/PUSCH may be disabled and configured simultaneous PUCCH/PUSCH is assumed as "misconfiguration".

Alternatively, a UE may assume that, if simultaneousPUCCH-PUSCH-r10 is configured as TRUE (i.e., simultaneous PUCCH/PUSCH is configured), PUCCH and PUSCH concurrent transmissions can be enabled among different CCs.

For example, if a UE is configured with CC1, CC2 and CC3 with simultaneousPUCCH-PUSCH-r10=TRUE, at least one PUCCH and at least one PUSCH from different CCs can be concurrently transmitted (e.g., PUCCH over CC1, PUSCH over CC3). Yet, this does not indicate that a UE can transmit PUCCH in CC1 and PUSCH in CC1 at the same time.

For the simultaneous PUCCH/PUSCH transmissions within a CC, a separate parameter can be configured per CC such as simultaneousPUCCH-PUSCH-within-CC. If this parameter is configured as TRUE for a carrier, a UE is able to transmit simultaneous PUCCH and PUSCH within the same CC.

If this approach is used, this implies that a UE can signal the capability of processing PUCCH and PUSCH simultaneously for dual connectivity case—in other words, PUCCH to one eNB and PUSCH to the other eNB can occur simultaneously.

However, this does not imply that a UE can support PUCCH and PUSCH simultaneous transmission within a carrier group or to one eNB and support PUCCH and PUSCH simultaneous transmission within another carrier group or to the other eNB simultaneously. Thus, each eNB cannot configure simultaneous PUCCH-PUSCH transmission within a carrier group.

Accordingly, to enable PUCCH-PUSCH simultaneous transmission capability within a carrier group, additional UE capability signaling may be needed (one example is simultaneousPUCCH-PUSCH-within-CC or simultaneousPUCCH-PUSCH-within-eNB).

Assuming the Case 2 (F2 is PCell and F1 is SCell over ideal backhaul), then a UE can be configured as simultaneousPUCCH-PUSCH-r10=TRUE to allow concurrent PUCCH on CC2 and PUSCH on CC1 transmissions where nonContiguousUL-RA-WithinCC-Info-r10=FALSE for CC2 and nonContiguousUL-RA-WithinCC-Info-r10=TRUE for CC1.

Embodiment 2 for PUCCH/PUSCH Simultaneous Transmission and Non-contiguous RA: Inter-Site CA with at Least One CC without Simultaneous PUCCH/PUSCH RF Capability This embodiment is for a combination of case 3 in table 3 and (nonContiguousUL-RA-WithinCC-Info-r10=True, simultaneousPUCCH-PUSCH=True)

For inter-site CA, if uplink control information (UCI) can be transmitted (by PUCCH) to PCell only, this configuration may be configured to a UE. However, if UCI is transmitted to PCell and SCell uplink respectively (due to large backhaul latency), simultaneous PUCCH/PUSCH transmission RF capability of each CC should be accounted for respectively and configured separately if needed.

Assuming a UE transmits PUCCH separately to PCell and SCell uplink CC, this embodiment can be further classified to cases whether the UE supports simultaneous PUCCH/PUCCH or not.

If the UE supports simultaneous PUCCH/PUCCH (this capability can be referred as dual connectivity capability):

(1) The UE can be configured with simultaneousPUCCH-PUCCH=TRUE, and configured with simultaneousPUCCH-PUSCH=TRUE.

In this case, UE assumes this configuration as misconfiguration as concurrent PUCCH/PUSCH transmission over SCell (CC2) cannot be accomplished due to the lack of RF capability. It is assumed that simultaneousPUCCH-PUSCH=FALSE always if at least one CC is lacking of simultaneous PUCCH/PUSCH RF capability where PUCCH is transmitted to the CC.

In this case, as the UE cannot transmit concurrent PUCCH and PUSCH even over different CCs within a carrier group, either scheduling restriction to allow TDM between CCs (between PUCCH and PUSCH transmissions) is employed, or PCell may use cross-carrier scheduling to handle scheduling restriction. Or it may be also possible that PCell and SCell coordinate to avoid collision between PUCCH and PUSCH transmissions.

However, this may not fully utilize the UE capability. Thus, alternatively, similar to embodiment 1, the parameter simultaneousPUCCH-PUSCH=TRUE is configured for PUCCH/PUSCH over CCs but not within a CC and separate parameters simultaneousPUCCH-PUSCH-within-CC can be configured per each CC to configure simultaneous PUCCH and PUSCH transmission within a CC.

If this approach is used, PUCCH and PUCCH can be simultaneously transmitted and PUCCH/PUSCH within a CC and across CCs can be configured separately.

Alternatively, in this case, without additional signaling, the network can assume that UE supports simultaneous PUCCH-PUSCH across different carrier groups or to different eNBs but not within a carrier group.

(2) The UE can be configured with simultaneousPUCCH-PUCCH=FALSE, and configured with simultaneousPUCCH-PUSCH=TRUE. In this case, similar to the above option, UE may assume that this configuration is a misconfiguration as PUCCH/PUSCH simultaneous transmission at CC2 cannot be accomplished.

It is assumed that simultaneousPUCCH-PUSCH=FALSE always if at least one CC is lacking of simultaneous PUCCH/PUSCH RF capability where PUCCH is transmitted to the CC. In this case, since both PUCCH/PUCCH and PUCCH/PUSCH concurrent transmissions are not allowed, either scheduling restriction to allow TDM between CCs (between PUCCH and PUSCH or between PUCCH and PUCCH) is employed, or PCell may use cross-carrier scheduling to handle scheduling restriction. Or it may be also possible that PCell and SCell coordinate to avoid collision between PUCCH and PUSCH or between PUCCH and PUCCH transmissions.

However, this may not fully utilize the UE capability. Thus, alternatively, similar to embodiment 1, the parameter simultaneousPUCCH-PUSCH=TRUE is configured for PUCCH/PUSCH over CCs but not within a CC and separate parameters simultaneousPUCCH-PUSCH-within-CC can be configured per each CC to configure simultaneous PUCCH and PUSCH transmission within a CC. If this approach is used, PUCCH and PUCCH cannot be simultaneously transmitted and thus it still requires scheduling restriction or coordination to avoid PUCCH/PUCCH collision. However, PUCCH/PUSCH within a CC and across CCs can be configured separately.

If the UE does not support simultaneous PUCCH/PUCCH, this case is similar to the case where a UE is configured with simultaneousPUCCH-PUCCH=FALSE.

Embodiment 3 for PUCCH/PUSCH Simultaneous Transmission and Non-contiguous RA: Inter-Site CA without Simultaneous PUCCH/PUSCH Capability This Embodiment is for a combination of case 3 in the table 3 and (nonContiguousUL-RA-WithinCC-Info-r10=Flase, simultaneousPUCCH-PUSCH=False)

If PUCCH and PUSCH simultaneous transmissions are not allowed in inter-site carrier aggregation, it implies that PUCCH and PUSCH cannot be transmitted simultaneously from different carriers over inter-site.

If scheduling is performed independently per site, it implies that collision between PUCCH and PUSCH (or between PUCCH and PUCCH) is handled by scheduling coordination or other means.

Assuming a UE is able to support simultaneous PUSCH/PUSCH (i.e., uplink CA) transmissions, it may be natural to support PUCCH/PUSCH over different carriers. Thus, even though a UE may not support simultaneous PUCCH/PUSCH within a band, it may still support PUCCH/PUSCH over different carriers when carrier aggregation is used.

In other words, regardless of RF capability of nonContiguousUL-RA-WithinCC-Info-r10 per band, if the UE supports uplink CA, PUCCH/PUSCH simultaneous transmission over different eNBs are assumed to be supported. In this case, it is still expected that UE's baseband capability of PUCCH-PUSCH simultaneous transmission capability is needed.

If the capability is not supported, either it can be assumed that the UE does not support dual connectivity or it can be mandated to support PUCCH-PUSCH simultaneous transmission capability if the UE supports dual connectivity. In this case, the field may be ignored. Thus, simultaneous PUCCH/PUSCH can be signaled per band and band combination separately where if simultaneous PUCCH/PUSCH transmission for band-combination is supported, PUCCH and PUSCH can be transmitted concurrently from different carrier or different bands if eNB configures simultaneous PUCCH/PUSCH transmission for that band-combination.

In other words, to support PUCCH-PUSCH simultaneous transmission, a UE needs to report its capability of simultaneous PUCCH/PUSCH transmission per band and also per band combination.

In addition, eNB needs to configure a UE of simultaneous PUCCH/PUSCH transmission per carrier and also for the carrier aggregation case similar to option discussed in embodiment 1 and embodiment 2.

Embodiment 4 for PUCCH/PUSCH Simultaneous Transmission and Non-contiguous RA: Inter-Site CA with PCell without Simultaneous PUCCH/PUSCH RF Capability This Embodiment is for a combination of case 3 in the table 3 and (nonContiguousUL-RA-WithinCC-Info-r10=True, simultaneousPUCCH-PUSCH=True)

This embodiment is similar to embodiment 2. The solutions to handle embodiment 2 can be applicable to this embodiment 4 as well.

Embodiment 5 for PUCCH/PUSCH Simultaneous Transmission and Non-contiguous RA: CA without Simultaneous PUCCH/PUSCH Transmission Capability If UE does not have baseband capability for handling PUCCH and PUSCH simultaneously, still the capability may be defined for each band and separately per band-combination.

Even though a UE may not be able to support simultaneous PUCCH/PUSCH over a band, it may still support simultaneous PUCCH/PUCCH and/or PUCCH/PUSCH over different carriers (may be limited to inter-band carrier aggregation).

In other words, if a UE does not support simultaneous PUCCH-PUSCH transmission but supports dual connectivity, the network cannot configure simultaneous PUCCH-PUSCH within a carrier group, but dual connectivity can be still configured.

That is, if the UE supports dual connectivity, the network can assume that simultaneous PUCCH-PUSCH (and PUCCH-PUCCH) transmission across different carrier groups can be supported. Accordingly, simultaneous PUCCH-PUSCH (and PUCCH-PUCCH) transmission across different carrier groups can be configured by the network when the UE supports dual connectivity. For each carrier group, the UE can be configured with PUCCH-PUSCH simultaneous transmission if the UE signals simultaneousPUCCH-PUSCH-r10=TRUE.

In other words, it can be also said that the existing capability signalling is used within a carrier group and new signalling is used across carrier groups or eNBs.

Alternatively, separate UE capability of simultaneous PUCCH/PUSCH (or PUCCH/PUCCH or the same capability to support both PUCCH/PUCCH and PUCCH/PUSCH) for one carrier (within a band) and for carrier aggregation (per band-combination) can be signalled.

The configuration of simultaneous PUCCH/PUSCH can be configured for each carrier (or per band) and/or for carrier aggregation (or per band combination).

The same parameter may configure to enable both PUCCH/PUSCH concurrent transmissions as well as PUCCH/PUCCH concurrent transmissions over different carriers or not. Or, separate parameters can be used to enable PUCCH/PUSCH simultaneous transmission and PUCCH/PUCCH simultaneous transmission for carrier aggregation scenario respectively.

Alternatively, it can be assumed that a UE shall be able to support simultaneous PUCCH/PUCCH over different carriers and/or simultaneous PUCCH/PUSCH over different carriers at least for inter-band CA so that additional UE capability signalling may not be needed. In other words, if a UE can support simultaneous PUSCH/PUSCH (PUCCH/PUSCH) and PUCCH/PUCCH transmission across carrier groups, it can be assumed that simultaneous PUCCH/PUSCH and/or simultaneous PUCCH/PUCCH over different carriers (not within a band or carrier) may be assumed to be supported as well.

So far, Embodiments for PUCCH/PUSCH simultaneous transmission and non-contiguous RA are described in detail. Hereinafter, other aspect (such as power control) for simultaneous transmission and other UE capabilities (such as MIMO capability, CSI capability) considered under dual connectivity are described.

UE Signalling of Uplink Power Control

When a UE supports simultaneous PUCCH and PUSCH (or PUCCH and PUCCH, or PUSCH and PUSCH) and the UE is configured with simultaneous PUCCH and PUSCH transmission, there could be cases where UE cannot transmit the simultaneous PUCCH and PUSCH transmission depending on the uplink power configured to each eNB when dual connectivity is used among eNBs over non-ideal backhaul.

For example, if the gap of transmission power to each eNB exceeds a certain threshold (e.g., 20 dB), even though a UE is capable of transmitting simultaneous PUCCH and PUSCH in terms of capability, it may not still transmit both channels at the same time.

The maximum gap a UE can handle may be signalled to eNB via UE capability signalling (reporting). The signalling can be given per band and/or per band-combination.

As another approach to signal and inform each eNB whether the UE can simultaneously transmit or not, the UE may transmit the configured uplink power to eNBs (other eNBs) so that each eNB may be able to infer whether the UE can perform simultaneous transmissions or not.

When simultaneous transmissions are not supported, eNB may configure a time division multiplexing (TDM) approach or configure a subset of subframes where a UE can transmit to each eNB.

Alternatively, when the gap between two uplink transmission powers exceeds the threshold, UE may indicate to eNB with lower power and ask to increase the power to a certain level to reduce the gap. Or, the UE may report its power level to each eNB so that each eNB may reconfigure the power to the level with which the UE can transmit simultaneous PUCCH and PUSCH transmission without power issue.

Power Control for PUCCH/PUSCH Simultaneous Transmission

In a dual connectivity case, there could be a few cases considered due to simultaneous PUCCH/PUCCH transmission with limited uplink power related to PUCCH/PUSCH simultaneous transmissions.

As PUCCH/PUSCH simultaneous transmission may need more maximum power reduction (MPR) than single PUCCH or PUSCH transmission from a UE capability perspective, it is not desirable to allow PUCCH/PUSCH simultaneous transmission when potentially two uplink transmissions could occur. To handle this case, a few alternative approaches can be considered.

(1) PUCCH/PUSCH simultaneous transmission would not be allowed with two uplink transmissions in inter-site resource aggregation scenarios. For example, if a UE is configured with inter-site CA and transmits PUCCH to each node/site/eNB respectively, regardless of PUCCH/PUSCH simultaneous transmission configuration, UE may assume that PUCCH/PUSCH simultaneous transmission is not allowed within one carrier group (per node/site/eNB or a set of carriers where one PUCCH is shared).

(2) PUCCH/PUSCH simultaneous transmission would not be configured to a UE if UE can support dual connectivity. To avoid RRC ambiguity, if a UE can support dual connectivity, UE may not support PUCCH/PUSCH simultaneous transmission.

(3) PUCCH/PUSCH simultaneous transmission only when one uplink transmission, i.e., if a UE is configured with simultaneous PUCCH/PUSCH transmission, PUCCH/PUSCH simultaneous transmission can be occurred only when a UE does not transmit two uplink transmissions. For example, if frequency division duplex (FDD) and time division duplex (TDD) eNB are performing inter-node resource aggregation, uplink transmission on subframes where TDD DL/UL configuration defines downlink (and thus only one uplink feasible to FDD UL), PUCCH/PUSCH simultaneous transmission can be allowed. Otherwise, a UE does not assume that simultaneous PUCCH/PUSCH transmissions would be occurred. (4) Similar to (3), a UE can transmit PUCCH/PUSCH simultaneously only when one uplink transmission occurs. In this case, it would depend on actual transmission rather than DL/UL configuration. In this case, the scheme is applied to cases of carrier groups where carriers are configured by single node/eNB.

(5) Similar to (3), the difference would be to allow different PUCCH/PUSCH simultaneous transmission capability per subframe set where a UE can be configured with one or more subframe sets. Unless configured explicitly per subframe set, a UE may assume that simultaneous PUCCH/PUSCH TX is not allowed.

(6) PUCCH/PUSCH simultaneous transmission (if configured) will be disabled if power-limited case occurs. When the total uplink power exceeds the maximum power, a UE first disable PUCCH/PUSCH simultaneous TX. By blindly detecting PUCCH or PUSCH, eNB may know whether one channel has been dropped due to power limitation or not.

(7) Dependence on PHR, i.e., following predefined or configured threshold, if PHR becomes less than a certain value or percentage (compared to allocated power), PUCCH/PUSCH simultaneous TX is disabled after reporting power headroom report (PHR). It can be triggered when PHR exceeds the threshold as well after reporting PHR. It can be triggered by higher layer as well.

(8) Depending on maximum allocated power per node or per carrier, i.e., similar to (7), power can be a factor to determine simultaneous PUCCH/PUSCH TX.

(9) Depending on pathloss, i.e., a UE in cell center may be allowed to use PUCCH/PUSCH. When pathloss changes dramatically and exceeds a certain valuew, a UE may disable simultaneous PUCCH/PUSCH after reporting PHR.

In addition to the approaches (1) to (9) or regardless of the approaches (1) to (9), when a UE disable PUCCH/PUSCH simultaneous transmission, it transmits either PUCCH or PUSCH with UCI piggybacking depending on the UCI type. For example, if sounding reference (SR) is transmitted via PUCCH, SR cannot be piggybacked on PUSCH, thus, PUCCH is transmitted and PUSCH is dropped. However, SR may not be needed to be transmitted when PUSCH scheduling is occurred, thus, even in this case, SR can be dropped.

If CSI or HARQ-ACK is transmitted over PUCCH, drop PUCCH and transmit PUSCH with piggybacking. When PUCCH and SPS PUSCH are colliding, piggybacking can be allowed. When PUCCH and PUSCH bundle are colliding, PUSCH piggybacking on the subframe can be attempted. When Ack/Neck bundling PUCCH and PUSCH collide, PUSCH is dropped and PUCCH is transmitted.

If PUCCH/PUSCH simultaneous transmission is configured under a dual connectivity, Type1/Type2 reporting will be triggered. In power headroom reporting (PHR) subframe, if PUCCH/PUSCH simultaneous transmission is disabled following one or more of alternatives (1) to (9) in above, two alternative approaches are feasible: (1) assume non-simultaneous transmission, or (2) assume simultaneous transmission. Here, type 1 PHR may be for PUSCH. Type 2 PHR may be for PUCCH when PUSCH is transmitted. Thus, while type 2 PHR may be transmitted together with type 1 PHR when simultaneous transmission is assumed, type 1 PHR may be transmitted without type 2 PHR when non-simultaneous transmission is assumed.

To avoid ambiguity, it is desirable to allow type1/type2 reporting in a dual connectivity scenario regardless of simultaneous PUCCH/PUSCH transmission or configuration. Further, this may be limited to the case where a UE is configured with simultaneous PUCCH/PUSCH.

In addition, assuming plurality of carrier group, for the transmission of the same carrier group, PHR may be transmitted considering the configuration of simultaneous PUCCH/PUSCH transmission and, for the transmission of other carrier group, PHR may be transmitted regardless of the configuration of simultaneous PUCCH/PUSCH transmission. For example, assuming that carrier 1 and carrier 2 belong to carrier group 1 and carrier 3 and carrier 4 belong carrier group 2 as well as carrier group 1 is its own carrier group, while type 1 PHR and type 2 PHR may be transmitted via carrier 3 regardless of the configuration of simultaneous PUCCH/PUSCH transmission, type 2 PHR may be transmitted carrier 1 only when simultaneous PUCCH/PUSCH transmission is configured.

Handling of RRC Ambiguity

When master eNB (MeNB) configures new RRC configuration for secondary eNB (SeNB), there is a possibility that temporarily the required UE capability exceeds UE's capability. One example is the handling of multi-input multi-output (MIMO) capability of UE.

A UE may report different max MIMO layers capabilities for different subblocks on a same band (such as for intra-band CA (non-contiguous)). For example, the UE may report for subblock 1 that maximum MIMO layer is 2 and report for subblock 2 that maximum MIMO layer is 4. Here, max MIMO layer may be a maximum number of layers the UE can support, i.e., maximum transmission rank the UE can support.

In the example above, since there is no definite rule on to which subblock (left or right) each capability should be applied, if master carrier group (MCG) configures maximum 4 layers, secondary carrier group (SCG) may shrink to maximum 2 layers because the UE reports that max MIMO layer is 4 for one subblock and 2 for other subblock.

However, in this example, it may also be assumed that MCG configures 2 layers and thus SCG configures 4 layers to maximize UE capability. Here, based on traffic change, if MCG changes number of its layer to 4 even before SCG layer is reduced number of layers to 2, it is possible that a UE may receive 4+4 layer support request from MCG.

There are overall two approaches (three alternatives) to address this temporarily exceeding UE capability issue in the case of RRC reconfiguration.

Alt1. Ignore RRC reconfiguration which exceeds UE capability. For example, let's also assume that a UE reports that max MIMO layer is 4 for one subblock and 2 for other subblock. If MCG reconfigures 4 layers whereas SCG configuration requires 4 layers as well which exceeds its capability 4+2, then UE can ignore RRC reconfiguration. Whether to report mis-configuration or not can be up to UE implementation or specified. To avoid this case, MCG may reduce layers for SCG first before increasing layers for MCG or reconfigure both carrier groups (CGs) at the same time.

Alt2. Apply RRC reconfiguration to the other CG implicitly. When MCG reconfigures the layer numbers, the UE updates SCG layer number aligned with its maximum UE capability. For example, let's also assume that a UE reports that max MIMO layer is 4 for one subblock and 2 for other subblock. If MCG configures 4 layers, the UE updates layers for SCG as 2 layers automatically even with explicit reconfiguration on SCG Alt3. Accept RRC reconfiguration and drop some data channels in case data transmission exceeds UE capability. For example, let's also assume that a UE reports that max MIMO layer is 4 for one subblock and 2 for other subblock. In Alt3, the UE temporarily accept configuration of 4+4 layers. Yet, the UE may not transmit any feedback as it exceeds its capability. Or, the UE may send feedback by giving the higher priority to MCG, i.e., the UE assumes 4 layers for MCG and 2 layers for SCG and then performs reporting.

With Alt3, for data transmission as well, it may assume that MCG can transmit up to 4 layers and SCG can transmit up to 2 layers and drop the data channel if it exceeds its assigned/assumed layer numbers. For example, PDSCH transmission from SCG if exceeds 2 layers can be dropped. In terms of dropping, a UE may drop any data or code word.

When transmitting HARQ-ACK/NACK with Alt3, a UE can transmit NACK to dropped codeword or PDSCH. Or, to indicate that a UE fails to receive the data, no HARQ-ACK/NACK feedback regarding the dropped codeword or PDSCH can be also considered. In this case, the HARQ-ACK/NACK bits are computed based on only available number of layers. For example, if configuration is done at 4+4 layers for MCG/SCG where the UE capability is 4+2 layers, HARQ-ACK/NACK is computed assuming 4 layers for MCG and 2 layers for SCG. Alternatively, HARQ-ACK is computed based on the configuration with assuming DTX for the dropped code-words.

Even though the examples are described with MIMO layers aspect, it can be also applicable to other cases where UE capability exceeded in the RRC reconfiguration period and/or where RRC reconfiguration such as CSI configuration including MIMO aspect described above exceeds UE capability.

For example, as to CSI processing capability similar to MIMO capability, UE capability may different for each band. Thus the US may report maximum CSI for each band. Then the process can be applied to the CSI case same as the case of MIMO capability described as above.

Backhaul Signaling to Exchange MIMO Capability

Currently, in terms of non-contiguous CA capability signalling for MIMO capability and/or CSI capability etc., a UE may report two values for the same band. For example, for intra-non-contiguous CA for CC1 and CC2, UE may report 2 layers for the same band and 4 layers for the same band twice. The eNB may interpret this as "a UE can support (2 layers, 4 layers) or (4 layers, 2 layers) combinations in the band if intra-non-contiguous CA is configured."

However, if dual connectivity is applied for intra-band non-contiguous CA, each eNB may not know the number of layers usable in a carrier without explicit coordination/signaling. Thus some approaches may be considered as below:

(1) each eNB may exchange the maximum number of layers per CC (intended), or MeNB may assign the maximum number of layers that SeNB can use for a carrier or for a band. Or, (2) MeNB may signal the number of layers intended to be used by MeNB to SeNB so that SeNB arranges its configuration accordingly not to exceed UE capability.

(3) In case, SeNB cannot determine the maximum number of layers due to either the lack of signaling or ambiguity, SeNB can either assume the lower number from the UE capability reporting as the maximum number of layers or higher number from the UE capability reporting as the maximum number of layers.

It can be further considered that dual connectivity may not be applied for intra-band non-contiguous carriers due to its difficulty to support or separate independent operation between two eNBs. Or, if a UE is configured with non-contiguous intra-band carriers for dual connectivity, it may assume that dual connectivity is configured to support PUCCH offloading in a CA scenario.

In other words, both eNBs are tightly synchronized and coordinated as in CA scenarios. In this case, without explicit signaling, a UE may assume that the network is synchronized and the operation can be based on the assumption of tight synchronization and good backhaul. At least, a UE can assume that the network is synchronized if intra-band non-contiguous carriers are configured for dual connectivity.

Even though this example of backhaul signaling is described for MIMO capability, other capability such as CSI processing capability can utilize the proposals of this application. In other words, depending on CSI processing capability report from UE, the backhaul signaling or eNB assumptions to assume the maximum usable CSI process can be determined.

For example, as to CSI processing capability similar to MIMO capability, UE capability may different for each band. Thus MeNB may assign maximum CSI for each band and then may signal configuration of maximum CSI on each band to SeNB (same as above (2) case for MIMO). Then the process can be applied to CSI case same as the case of MIMO capability described as above.

FIG. 7 is a flow chart briefly describing UE's operation according to the present invention.

Referring to FIG. 7, the UE may receive signals on a downlink channel including a downlink control channel and a downlink data channel at step S710. The UE may receive signals from more than one eNB in dual connectivity circumstance. The signal may contain information on parameter(s) and/or configuration for uplink transmission, etc., under dual connectivity. The configuration may be RRC configuration. The details for information on parameter(s) and/or configuration are same as described before.

The UE may configure a parameter for the wireless communication based on the capability of the UE and information in the downlink control channel at step of S720. For example, the UE may configure the field such as simultaneousPUCCH-PUSCH, nonContiguousUL-RA- WithinCC-info as described before. The UE may operate based on the configuration based on the parameter or the configuration such as RRC configuration, but considering its own capability. The UE also may configure transmission power control considering simultaneous transmission of PUCCH and PUSCH.

In addition, simultaneous transmission of PUCCH and PUSCH for the UE is configured across carrier groups but is not configured within a carrier group when the UE supports dual connectivity but it does not support simultaneous transmission of PUCCH and PUSCH. That is, simultaneous PUCCH-PUSCH (and PUCCH-PUCCH) transmission across different carrier groups can be configured for the UE by the network when the UE supports dual connectivity. These are also described before.

The UE may transmit signals on an uplink channel based on the configured parameter at step of 5730. Here, the signals may be transmitted to at least two cells in dual connectivity circumstance. The UE may transmit PUCCH and PUSCH simultaneously supporting non-contiguous RA before and may transmit via multiple layers with its MIMO capability. The signal may contain PHR and the UE may transmit PHR based on the configuration of simultaneous PUCCH/PUSCH transmission. The detailed operation as to transmission based on UE's capability such as PUCCH/PUSCH simultaneous transmission, MIMO capability, and/or CSI capability are same as described above.

FIG. 8 is a flow chart briefly describing operation of eNB according to the present invention.

Referring to FIG. 8, the eNB may receive signals on an uplink channel including an uplink control channel and an uplink data channel at step S810. The signals may contain CSI report and report of UE capability. Further, the signal may be transmitted not based on configuration but based on UE capability. The details are same as described.

The eNB may configure a parameter and/or schedule UL/DL based on the capability of the UE informed by received signal at step of S820. Under dual connectivity, MeNB and SeNB may signal each other to schedule UL/DL reconfigure parameters. Or, the MeNB may schedule UL/DL and reconfigure parameter and then may inform them to SeNB. These scheduling and reconfiguration may be performed UE capability.

For example, the eNB may configure simultaneous transmission of PUCCH and PUSCH for the UE across carrier groups but the eNB may not configure simultaneous transmission of PUCCH and PUSCH for the UE within a carrier group when the UE supports dual connectivity but it does not support simultaneous transmission of PUCCH and PUCSH.

The eNB may transmit signals on a downlink channel based on the configured parameter and/or UL/DL scheduling at step of S830.

FIG. 9 is a block diagram which briefly describes a wireless communication system including an UE 900 and a BS 940. The UE 900 and the BS 940 may operate based on the description as explained above.

In view of downlink, a transmitter may be a part of the BS 940 and a receiver may be a part of the UE 900. In view of uplink, a transmitter may be a part of the UE 900 and a receiver may be a part of the BS 940.

Referring to FIG. 9, the UE 900 may include a processor 910, a memory 920 and a radio frequency (RF) unit 930.

The processor 910 may be configured to implement proposed procedures and/or methods described in this application. For example, the processor 910 may configure parameter, or may interpret parameter/configuration based on its own capability. Specifically, the processor may (re)configure simultaneous PUCCH/PUSCH transmission or MIMO configuration based on its own capability considering information signaled from eNBs. For example, simultaneous transmission of PUCCH and PUSCH for the UE is configured across carrier groups but is not configured within a carrier group when the UE supports dual connectivity but it does not support simultaneous transmission of PUCCH and PUSCH. The details are same as described before.

The processor 910 may also perform transmission power control considering the configuration of simultaneous PUCCH/PUSCH transmission. The processor 910 may transmit PHR based on the configuration of simultaneous PUCCH/PUSCH transmission. The details are described above.

The memory 920 is coupled with the processor 910 and stores a variety of information to operate the processor 910, which includes data information and/or control information. The RF unit 930 is also coupled with the processor 910. The RF unit 930 may transmit and/or receive a radio signal.

The BS 940 may include a processor 950, a memory 960 and a RF unit 970. Here, the BS may be PCell or SCell and the BS may be a macro cell or small cell.

The processor 950 may be configured to implement proposed procedures and/or methods described in this application. For example, the processor 950 configure a parameter and/or schedule UL/DL based on the capability of the UE.

For example, the processor 950 may configure simultaneous transmission of PUCCH and PUSCH for the UE across carrier groups but the processor 950 may not configure simultaneous transmission of PUCCH and PUSCH for the UE within a carrier group when the UE supports dual connectivity but it does not support simultaneous transmission of PUCCH and PUSCH.

Under dual connectivity, the processor may signal to other BS to schedule UL/DL reconfigure parameters. If the BS is MeNB, the processor 950 may schedule UL/DL and reconfigure parameter and then may inform them to other BS. The details are same as described above.

The memory 960 is coupled with the processor 950 and stores a variety of information to operate the processor 950, which includes data information and/or control information. The RF unit 970 is also coupled with the processor 950. The RF unit 970 may transmit and/or receive a radio signal.

The UE 900 and/or the BS 940 may have single antenna or multiple antennas. The wireless communication system may be called as MIMO system when at least one of the UE 900 and the BS 940 has multiple antennas.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for wireless communication by a user equipment (UE) based on a capability of the UE, the method comprising:
 receiving signals on a downlink channel including a downlink control channel and a downlink data channel;
 configuring a parameter for the wireless communication based on the capability of the UE and information in the downlink control channel; and
 transmitting signals based on the configured parameter across multiple different carriers,
 wherein the transmitting of the signals includes simultaneously transmitting an uplink control channel and an uplink shared channel for the UE across the multiple different carriers, when the UE supports dual connectivity and does not support the simultaneous transmission over one carrier to which the UE belongs.

2. The method of claim 1, wherein the capability of the UE is whether or not the UE supports the simultaneous transmission of the uplink control channel and the uplink shared channel, and whether or not the UE supports non-contiguous resource allocation.

3. The method of claim 1, wherein when the UE supports dual connectivity, the simultaneous transmission of the uplink control channel and the uplink shared channel for the UE is performed across the multiple different carriers even when the simultaneous transmission is not configured within the multiple different carriers.

4. The method of claim 1, wherein when the UE supports dual connectivity, the transmitting of the signals includes simultaneously transmitting the uplink control channel and another uplink control channel for the UE across the multiple different carriers, when the UE does not support the simultaneous transmission over one carrier to which the UE belongs.

5. The method of claim 1, wherein in the step of transmitting signals, a power headroom report for the uplink control channel is transmitted in a subframe where the power headroom report for the uplink shared channel is transmitted when the simultaneous transmission of the uplink control channel and the uplink shared channel is configured.

6. The method of claim 1, wherein in the step of transmitting signals, a power headroom report for the uplink control channel is transmitted for a component carrier in a different carrier group while the power headroom report for the uplink control channel is transmitted based on the capability of the UE for a component carrier in same carrier group.

7. The method of claim 6, wherein a power headroom report for the uplink control channel is transmitted for the component carrier in the same carrier group when simultaneous transmission of the uplink control channel and the uplink shared channel is not configured.

8. The method of claim 1, wherein in the step of transmitting signals, power headroom reports for the uplink control channel and the uplink shared channel are enabled regardless of the capability of the UE for simultaneous transmission of the uplink control channel and the uplink shared channel.

9. The method of claim 1, wherein the step of receiving signals includes receiving information on a radio resource control (RRC) configuration which is reconfigured between cells,
 wherein the step of configuring the parameter includes reconfiguring the RRC configuration based on the capability of the UE, and
 wherein the step of transmitting signals includes transmitting signals based on the reconfigured RRC configuration.

10. The method of claim 9, wherein in the step of configuring the parameter, the received RRC configuration is ignored when the configuration is not supported by the UE.

11. The method of claim 9, wherein in the step of configuring the parameter, the RRC configuration is reconfigured based on a configuration which is enabled to be supported by the UE.

12. The method of claim 9, wherein the RRC configuration is a configuration on multiple-input multiple-output (MIMO), and wherein the RRC configuration is configured by a cell managed by a master node-B among the multiple different carriers.

13. The method of claim 12, wherein the configuration on MIMO is configured based on a report on the capability for MIMO of the UE which supports non-contiguous resource allocation.

14. The method of claim 9, wherein the RRC configuration is a configuration on channel state information (CSI), and wherein the RRC configuration is configured by a cell managed by a master node-B among the multiple different carriers.

15. A user equipment (UE) for wireless communication, the UE comprising:
 a transmitter that transmits a radio signal;
 a receiver that receives a radio signal; and
 a processor, operatively coupled to the transmitter and the receiver, that:
 controls the receiver to receive signals on a downlink channel including a downlink control channel and a downlink data channel;
 configures a parameter for the wireless communication based on a capability of the UE and information in the downlink control channel; and
 controls the transmitter to perform simultaneous transmission of an uplink control channel and an uplink shared channel for the UE across multiple different carriers, when the UE supports dual connectivity and does not support the simultaneous transmission over one carrier to which the UE belongs.

* * * * *